United States Patent [19]
Brand

[11] Patent Number: 6,023,851
[45] Date of Patent: Feb. 15, 2000

[54] TRACTION MOTOR BRUSH HOLDER SUPPORT EVALUATION METHOD AND APPARATUS

[75] Inventor: Terrance Alan Brand, Erie, Pa.

[73] Assignee: General Electric Company, Erie, Pa.

[21] Appl. No.: 09/015,229

[22] Filed: Jan. 29, 1998

[51] Int. Cl.[7] .................................................. G01B 5/25
[52] U.S. Cl. ............................................................. 33/645
[58] Field of Search ............................. 33/645, 294, 613, 33/655, 286

[56] References Cited

U.S. PATENT DOCUMENTS

| | | | |
|---|---|---|---|
| 1,743,546 | 5/1930 | Hill | 33/645 |
| 2,342,828 | 5/1944 | Armitage et al. | 33/286 |
| 2,833,050 | 3/1958 | Byrd et al. | 33/645 |
| 3,101,553 | 8/1963 | Rish | 33/645 |
| 3,106,781 | 10/1963 | Eisele | 33/655 |
| 3,289,298 | 12/1966 | Standridge | 33/286 |
| 3,956,830 | 5/1976 | MacMillan | 33/337 |

FOREIGN PATENT DOCUMENTS 988211  4/1965  United Kingdom ....................... 33/74

*Primary Examiner*—G. Bradley Bennett
*Assistant Examiner*—Maria Fernandez
*Attorney, Agent, or Firm*—Ann M. Agosti; Jill M. Breedlove

[57] ABSTRACT

A test system predicts when brush holder support blocks in a traction motor frame commutator chamber are properly oriented with respect to each other and a bore axis. Brush holders are modified to include a rod extending orthogonally therefrom. First and second rods extending from opposite sides of the commutator chamber are substantially parallel, and third and fourth rods extending from opposite sides of the commutator chamber are also substantially parallel. The four rods form a rectangle-like polygon having first and second opposed sides and third and fourth opposed sides. In accordance with the testing method, the lengths of the sides, the difference between the lengths of the first and second opposed sides, and the difference between the lengths of the third and fourth opposed sides provide an indication of the orthogonality and spacing of the brush holder support blocks with respect to the bore axis.

10 Claims, 3 Drawing Sheets

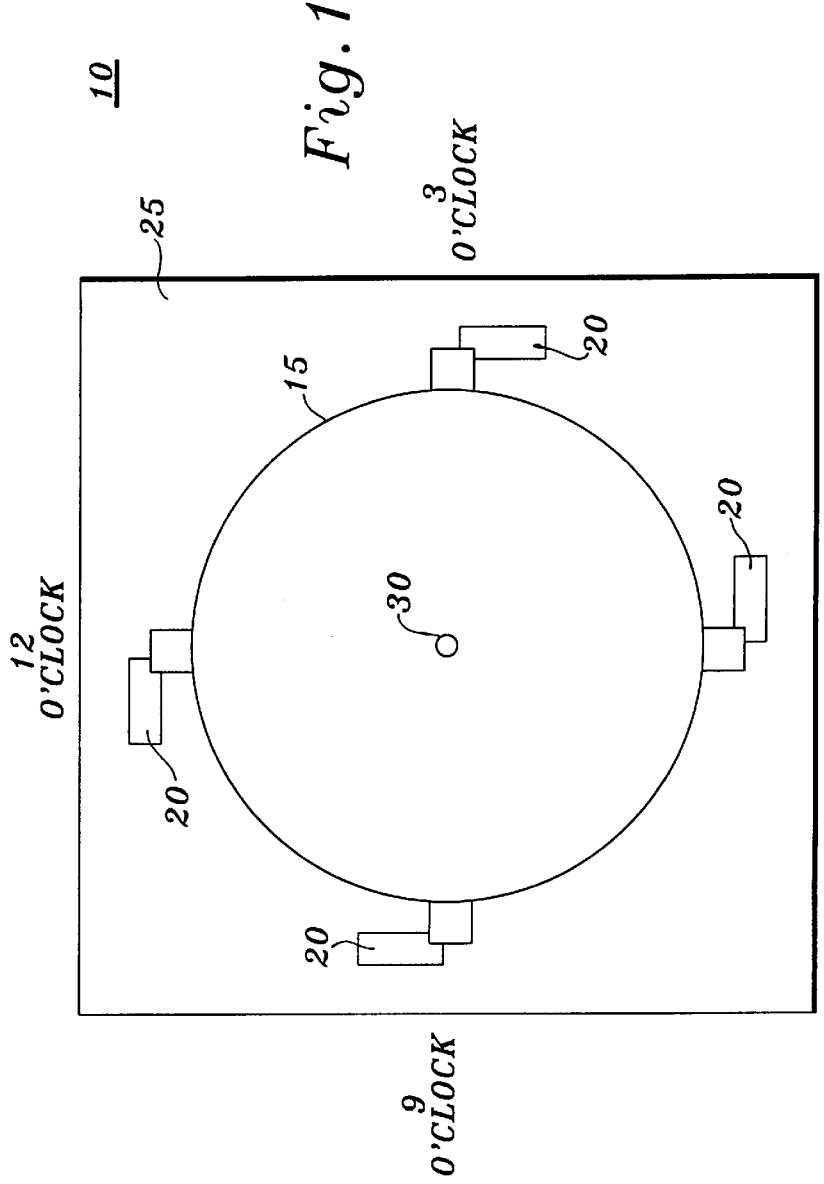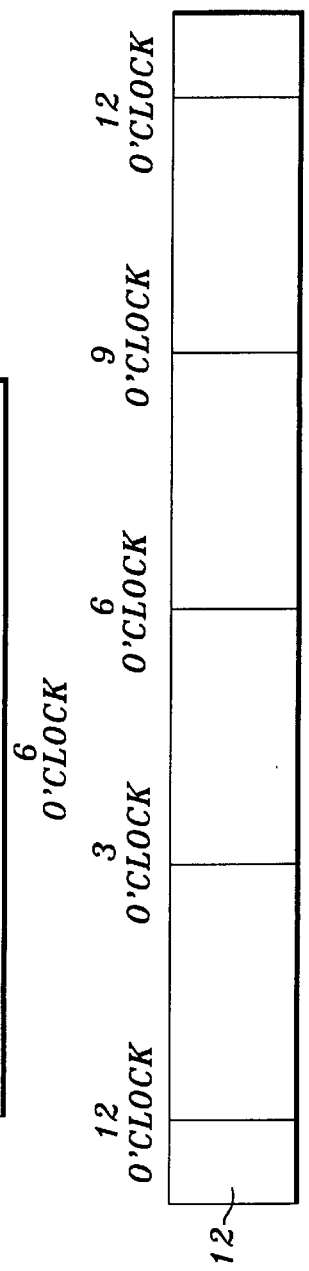

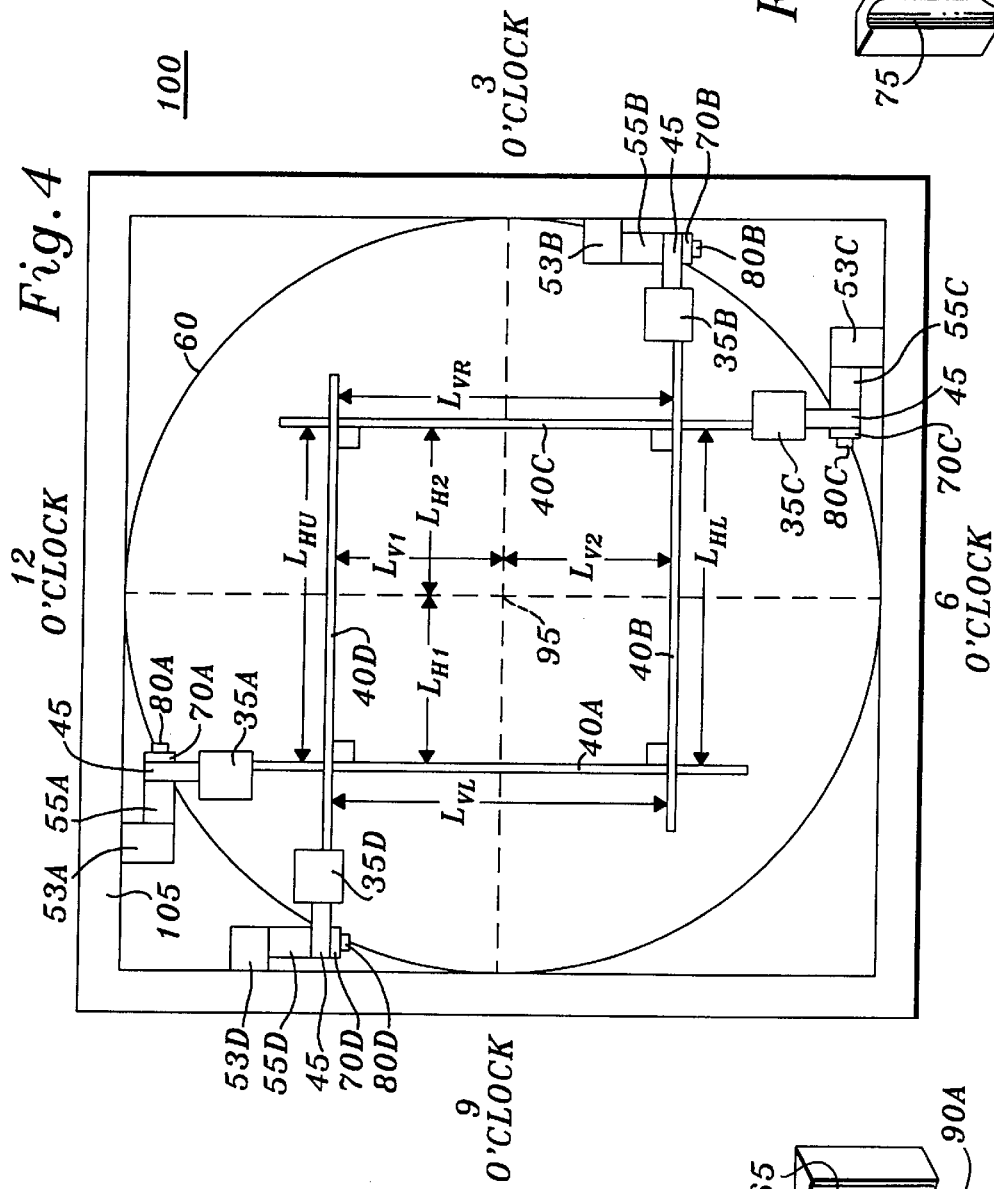
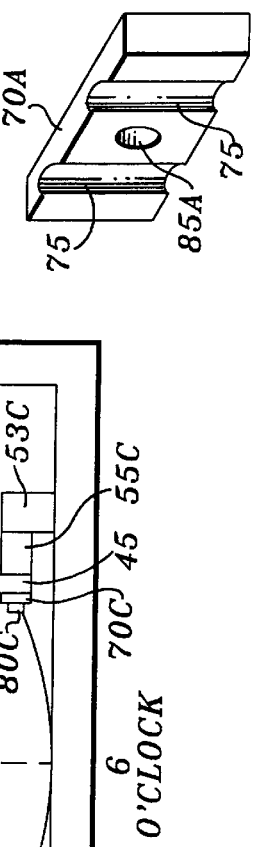
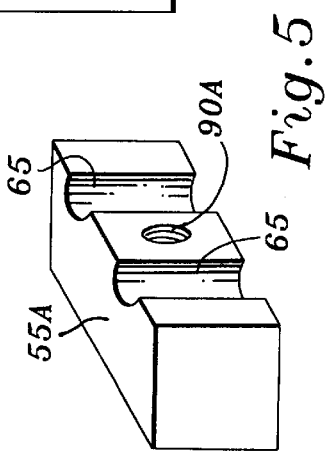
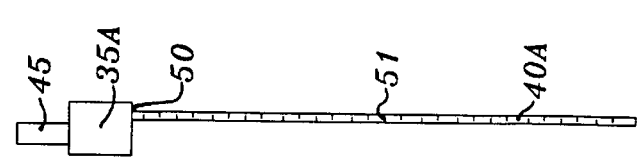

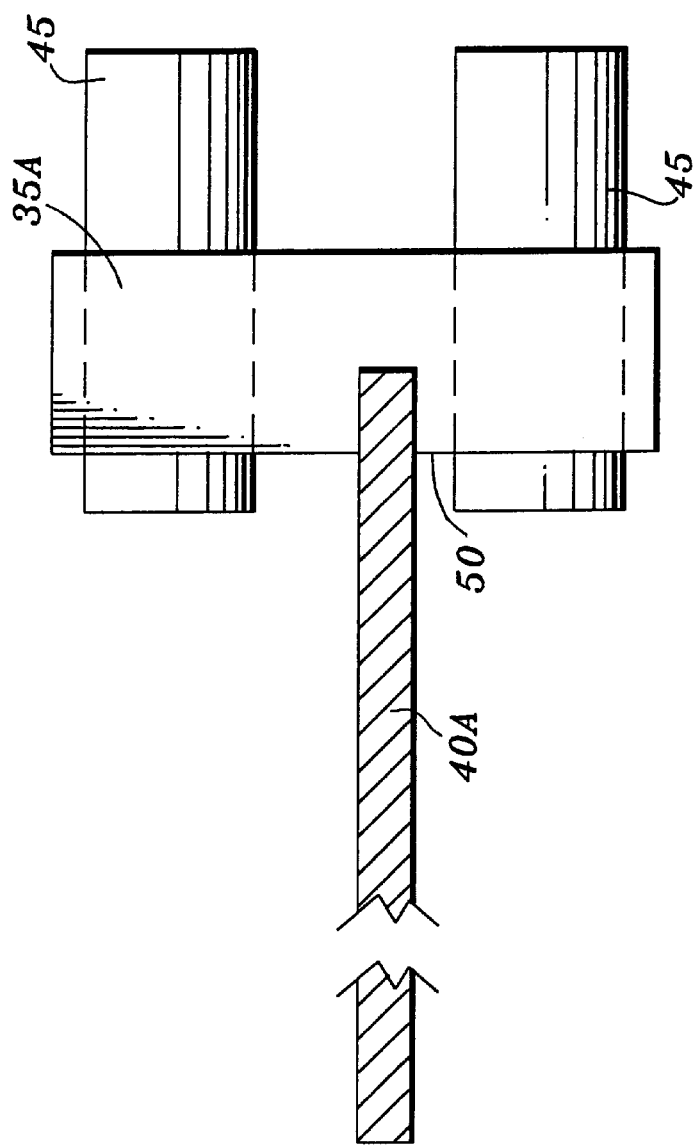
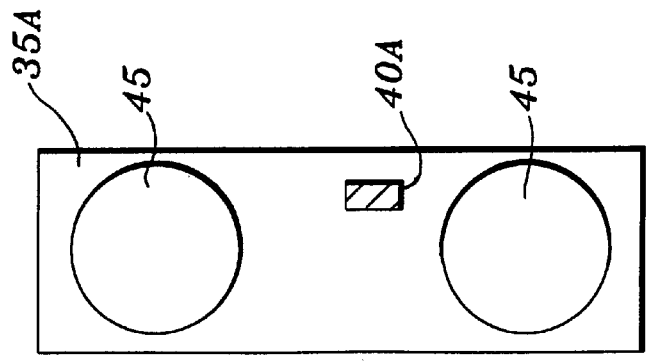

TRACTION MOTOR BRUSH HOLDER SUPPORT EVALUATION METHOD AND APPARATUS

BACKGROUND OF THE INVENTION

This invention relates in general to the testing of traction motors and, more particularly, to the testing of such motors to determine if the brush holder supports of the motors are properly aligned.

After a traction motor is used for a substantial amount of time, it is common to rebuild the motor to extend its operating life. One step in rebuilding the motor is to rebuild the motor frame. When rebuilding the motor frame, it is desirable to predict if a particular motor frame will pass the critical to quality characteristic of brush spacing which in the past was measured after significant effort was expended on the frame and the motor was reassembled.

SUMMARY OF THE INVENTION

Accordingly, it would be desirable to have a method to predict if a particular motor frame will meet brush spacing criteria.

It would also be desirable to have a brush holder spacing test and test system which reduces the defect rate in motor rebuilding and which reduces motor rework.

In accordance with one embodiment of the present invention, a method is provided for predicting when first, second, third and fourth brush holder support blocks of a motor having a bore axis are properly positioned with respect to the bore axis. The method includes the step of positioning first and second substantially parallel rods at the first and second brush holder support blocks of the motor. The method also includes the step of positioning third and fourth substantially parallel rods at the third and fourth brush holder support blocks of the motor. The first, second, third and fourth rods form a rectangle-like polygon including first and second opposed sides and third and fourth opposed sides. The method further includes the steps of determining the lengths of the opposed sides, determining the difference of the lengths of the first and second opposed sides resulting in a first difference, and determining the difference of the lengths of the third and fourth opposed sides resulting in a second difference. The magnitudes of the first and second differences provide an indication of the orthogonality and spacing of the first, second, third and fourth brush holder support blocks with respect to the bore axis.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 1 is a representation of a traction motor upon which a paper tape test is conducted to determine brush holder support block alignment.

FIG. 2 is a plan view of the paper tape used in the test configuration of FIG. 1.

FIG. 3 is a plan view of a modified brush holder used in the disclosed brush holder support block alignment test methodology.

FIG. 4 is a cross section of a motor which is configured to be tested in accordance with the disclosed testing methodology.

FIG. 5 is a perspective view of a brush holder support block.

FIG. 6 is a perspective view of a clamping block which mates with the brush holder support block of FIG. 5 to hold the modified brush holder of FIG. 3 in position.

FIG. 7 is an end view of a modified brush holder with test rod.

FIG. 8 is a side plan view of the brush holder of FIG. 7.

DETAILED DESCRIPTION OF THE INVENTION

FIG. 1 is a representation of a traction motor upon which a paper tape test is conducted to determine brush holder support block alignment, and FIG. 2 is a plan view of the paper tape used in the test configuration of FIG. 1.

As seen in FIG. 1, one way to test the spacing of the brush holders of a traction motor 10 after the traction motor is assembled is by wrapping a paper tape 12 (FIG. 2) around the commutator 15 and applying an inked knife-edge fixture in place of a brush in all four brush holders as indicated in FIG. 1. The marks left on the tape are measured and the maximum allowed difference between any two of the lengths is 5/64 inches in one representative motor. The key characteristic of the motor that determines the result of this test is the alignment of the brush holder support blocks 20 in motor frame 25 with respect to each other and to bore axis 30. If the spacing between the brush holders in the respective brush holder support blocks 20 is excessive, an electrical timing error in the motor can result. If the above-mentioned critical-to quality specification is exceeded, the paper tape is evaluated to determine which brush holder support blocks 20 must be machined to correct the deficiency. The motor is then disassembled, the frame is reworked and the motor is reassembled.

FIGS. 3–8 are views of a predictive measurement system of the present invention for motor frame evaluation. Four substantially similar modified brush holders 35A, 35B, 35C and 35D are mounted in motor 100 of FIG. 4. Brush holders 35A, 35B, 35C and 35D are mounted in locations designed to provide brushes (not shown) at 12 o'clock, 3 o'clock, 6 o'clock and 9 o'clock positions respectively.

More specifically, the four brush holders are modified by removing carbon ways and brush springs and by adding respective rods 40A, 40B, 40C and 40D extending in a plane parallel to brush holder insulating posts 45. For example, FIG. 3 shows a representative brush holder 35A with insulating posts 45 and rod 40A attached thereto.

As shown in FIG. 4, studs 53A, 53B, 53C, and 53D are welded to motor frame 105 adjacent commutator chamber 60 as shown to hold brush holder support blocks 55A, 55B, 55C, and 55D in position. More particularly, brush holder support blocks are attached to or integrally formed with studs to provide mounts for modified brush holders 35A, 35B, 35C, and 35D.

As seen more clearly in FIG. 5, brush holder support block 55A includes two half-moon shaped indentations 65 for receiving the respective insulating posts 45 of modified brush holder 35A. In a similar fashion, clamping block 70A of FIG. 6 includes two half-moon shaped indentations 75 for receiving the respective insulating posts 45 of modified brush holder 35A. The cylindrical insulating posts 45 are positioned between brush holder support block 55A and clamping block 70A in the space formed by indentations 65 and 75. A bolt 80A is then driven through hole 85A of clamping block 70A and through threaded hole 90A of brush holder support block 55A.

In this manner, brush holder 35A is mounted in position with rod 40A oriented orthogonal with respect to base surface 50 of brush holder 35A. Modified brush holders 35B, 35C and 35D with respective rods 40B, 40C and 40D are likewise mounted in position around commutator chamber 60 at positions selected to provide brushes at the 3 o'clock, 6 o'clock and 9 o'clock positions.

When brush holder support blocks 55A, 55B, 55C and 55D are properly positioned with respect to commutator chamber 60, rods 40A, 40B, 40C and 40D form a rectangle and touch each other at the corners of the rectangle. Each respective rod should be in physical contact with the two corresponding parallel rods. For example, rod 40A should be touching rods 40B and 40D. It is not important which rod overlaps the other rods.

The test system is advantageously employed to quantify the positions of the brush holder support blocks 55A, 55B, 55C and 55D. The test system results are found to correlate with the paper tape test results, and thus the system is predictive of the paper tape test results that are determined after motor final assembly.

It was found that important characteristics of the brush holder support blocks 55A, 55B, 55C, 55D are their distances from bore axis 95 of motor 100 and that the seating surface of each block be orthogonal to bore axis 95 within commutator chamber 60 of motor frame 105.

The disclosed test system measures the lengths of the sides of the rectangle formed by rods 40A, 40B, 40C and 40D. A scale or rule (shown by marks 51 in FIG. 3) is marked on each rod for this purpose. A rectangle (having four approximately ninety degree angles) is formed if the brush holder support blocks are ideally positioned about commutator chamber 60. It is also important that the sides of the rectangle be situated an appropriate distance from bore axis 95.

The sides of the actual rectangle-like polygon formed by rods 40A, 40B, 40C and 40D are given below: $L_{VL}$ represents the vertical length of the left side (along rod 40A) between rods 40B and 40D; $L_{VR}$ represents the vertical length of the right side (along rod 40C) between rods 40B and 40D; $L_{HU}$ represents the horizontal length of the upper side (along rod 40D) between rods 40A and 40C; and $L_{HL}$ represents the horizontal length of the lower side (along rod 40B) between rods 40A and 40C. These four lengths, $L_{VL}$, $L_{VR}$, $L_{HU}$ and $L_{HL}$, are all measured by the test operator using the scales marked on rods 40A–40D.

With ideal brush holder support block spacing, the difference between the left and right vertical sides, $L_{VL}$ and $L_{VR}$, goes to zero, namely, $$|L_{VL} - L_{VR}| = 0,$$

and the difference between the upper and lower horizontal sides, $L_{HU}$ and $L_{HL}$, goes to zero, namely, $$|L_{HU} - L_{HL}| = 0.$$

If $|L_{VL} - L_{VR}|$ and $|L_{HU} - L_{HL}|$ are found to be less than a predetermined tolerance value, such as 5/64 of an inch, for example, then the formed rectangle is substantially orthogonal for test purposes.

After determining that the rods form a rectangle, the second test relates to the positions of the brush holders. The distances between bore axis 95 and the brush holders mounted in respective brush holder support blocks 55A, 55B, 55C and 55D are quantities that can be provided in the specifications of the particular motor. More particularly, the actual values of these distances off bore axis (which may vary from the specification values) are given below as: $L_{V1}$ represents the vertical distance between brush holder 35D and bore axis 95; $L_{V2}$ represents the vertical distance between brush holder 35B and bore axis 95; $L_{H1}$ represents the horizontal distance between brush holder 35A and bore axis 95; and $L_{H2}$ represents the horizontal distance between brush holder 35C and bore axis 95. The spec values for the above quantities $L_{V1}$, $L_{V2}$, $L_{H1}$ and $L_{H2}$ taken from the motor specifications are given as $L_{V1S}$, $L_{V2S}$, $L_{H1S}$ and $L_{H2S}$, respectively.

Once the lengths $L_{VL}$, $L_{VR}$, $L_{HU}$ and $L_{HL}$ are measured by the test operator, the actual distance off bore axis can be estimated as follows for each of the four brush holder support blocks in the same manner as discussed for below with respect to block 35A. First a distance of $L_{H2}$ is estimated by subtracting $L_{H1S}$ from $L_{HU}$ or from $L_{HL}$ (the test could be performed for each horizontal distance or be only performed for one of the two horizontal distances). Next $L_{H2}$ is compared with the specification value $L_{H2S}$, and, if $L_{H2}$ is within a predetermined range of the specification value, $L_{H2}$ is an acceptable value. If all four measurements $L_{VL}$, $L_{VR}$, $L_{HU}$ and $L_{HL}$ yield acceptable values of $L_{H1}$, $L_{V1}$, $L_{H2}$ and $L_{V1}$ as set forth in the above determinations, then the brush holder support blocks of the motor under test exhibit acceptable distances off the bore axis. In a method requiring less steps that the preceding paragraph, each of $L_{VL}$ and $L_{VR}$ can be compared with a total value representing $L_{V1S}$ plus $L_{V2S}$ plus an offset to adjust for the distance of the face of the rod to the face of the insulating post plus or minus a tolerance factor, and each of $L_{HU}$ and $L_{HL}$ can be compared with a total value representing $L_{H1S}$ plus $L_{H2S}$ plus an offset to adjust for the distance of the face of the rod to the face of the insulating post plus or minus a tolerance factor. The only circumstance in which this method might fail to diagnose an unacceptable condition is in the unlikely event that the rectangle has four ninety degree angles, four appropriately lengths, but is shifted because two or four of the brush holder support blocks have shifted the exact same distance and/or direction.

EXAMPLES

In one embodiment, the sum of $L_{V1S}$ plus $L_{V2S}$ plus the offset is 11 and 63/64 inches, the sum of $L_{H1S}$ plus $L_{H2S}$ plus the offset is 11 and 36/64 inches, and the tolerance for each sum and the predetermined difference allowed between lengths is 5/64 inches.

The following Example 1 provides sample values for the measured lengths discussed above when the brush holder support blocks are properly aligned and spaced about commutator chamber 60.

$L_{VL} = 12^{2}/_{64}"$ $L_{VR} = 12^{1}/_{64}"$ $L_{HU} = 11^{37}/_{64}"$

1 $L_{HL} = 11^{38}/_{64}"$.

The following Example 2 provides sample values for the measured lengths when the brush holder support blocks are improperly aligned.

$L_{VL} = 11^{60}/_{64}"$ $L_{VR} = 11^{61}/_{64}"$ $L_{HU} = 11^{28}/_{64}"$ $L_{HL} = 11^{35}/_{64}"$.

Example 2 illustrates two defects. First, $L_{HU}$ is not within the range of 11 and 36/64 inches plus or minus 5/64 inches. Second, the difference between $L_{HL}$ and $L_{HU}$ is greater than 5/64 inches.

FIG. 7 is an end view of a representative modified brush holder 35A with a test rod 40A extending therefrom. FIG. 8 is a side plan view of modified brush holder 35A with test rod 40A shortened for illustration purposes. For purposes of example, two insulating posts are shown for each brush holder in FIGS. 7 and 8. In other embodiments, one insulating post or more than two insulating posts can be used in accordance with the present invention.

It is noted that rod 40A extends orthogonally from base surface 50 of modified brush holder 35A as shown in FIG. 8. Stated alternatively, rod 40A is oriented substantially parallel with the two brush holder insulating posts 45 at the base of rod 40A.

In one embodiment, scales such as the 24 inch Starrett C604-24 scale with 1/64" demarcations are respectively situated directly on the four rods 40A, 40B, 40C and 40D of the modified brush holders to provide a non-contact, direct reading of the lengths, $L_{VL}$, $L_{VR}$, $L_{HU}$ and $L_{HL}$. In one embodiment of the test system, one insulating post of each of the four brush holders is replaced by a sleeved cylindrical magnet to assist with operator setup. More particularly, a rare earth magnet is used to hold the modified brush holder in place while the operator bolts the holder into position.

In summary, by using the disclosed test system to determine when the differences $|L_{VL}-L_{VR}|$ and $|L_{HU}-L_{HL}|$ are minimal or less than a predetermined value or when a length $L_{VL}$, $L_{VR}$, $L_{HU}$, or $L_{HL}$ is outside a respective predetermined range, a prediction is made as to whether or not a particular motor will pass the earlier described paper tape test. In other words, a prediction is made as to whether or not the frame of a motor under rework passes critical to quality brush spacing criteria. The modified brush holders enable a determination of the distances of the brush holder support blocks off the bore axis and a determination of the orthogonality of the respective seating surfaces of the brush holder support blocks with respect to the bore axis.

While only certain preferred features of the invention have been shown by way of illustration, many modifications and changes will occur to those skilled in the art. It is, therefore, to be understood that the present claims are intended to cover all such modifications and changes which fall within the true spirit of the invention.

I claim:

1. A method of predicting when first, second, third and fourth brush holder support blocks of a motor having a bore axis are properly positioned with respect to the bore axis, the method comprising the steps of:

providing first and second substantially parallel rods positioned with respect to the first and second brush holder support blocks of the motor, third and fourth substantially parallel rods positioned with respect to the third and fourth brush holder support blocks of the motor, such that the first, second, third and fourth rods form a rectangle-like polygon including first and second opposed sides and third and fourth opposed sides;

determining the lengths of the first, second, third, and fourth opposed sides;

determining a first difference comprising a difference of the lengths of the first and second opposed sides;

determining a second difference comprising a difference of the lengths of the third and fourth opposed sides; and using the lengths of the first, second, third, and fourth opposed sides and the first and second differences to provide an indication of the orthogonality and spacing of the first, second, third and fourth brush holder support blocks with respect to the bore axis.

2. The method of claim 1 wherein each of the first, second, third, and fourth rods includes marks situated thereon and wherein determining the lengths of the first, second, third, and fourth opposed sides includes measuring the lengths using the marks.

3. The method of claim 1 further including the step of classifying the motor as rejected if either of the first and second differences is greater than a respective predetermined value.

4. The method of claim 3 comprising the step or classifying the motor as rejected if any of the first, second, third, or fourth opposed sides is outside of a respective predetermined range.

5. A test system for determining the proper positioning of brush holder support blocks on a motor having a bore axis comprising:

a motor including a frame having a commutator chamber;

first, second, third and fourth brush holder support blocks situated about the commutator chamber;

first, second, third and fourth brush holders mechanically coupled to the first, second, third and fourth brush holder support blocks, respectively; and first, second, third and fourth rods extending orthogonally from the first, second, third and fourth brush holders, the first and second rods being oriented substantially parallel to each other, the third and fourth rods being oriented substantially parallel to each other, such that the first, second, third and fourth rods form a rectangle-like polygon including first and second opposed sides and third and fourth opposed sides, so that the lengths of the first, second, third, and fourth opposed sides, as well as the difference in length of the first and opposed second sides and the difference in length of the third and fourth opposed sides can be used to provide an indication of the orthogonality and spacing of the first, second, third and fourth brush holder support blocks with respect to the bore axis.

6. The test system of claim 5 wherein the first, second, third and fourth rods include respective integral scale marks.

7. The test system of claim 5 further comprising first, second, third and fourth clamping structures, each clamping structure for holding a respective one of the brush holders to respective one of the brush holder support blocks.

8. The test system of claim 7 wherein each brush holder includes at least one post extending therefrom, wherein each brush holder support block includes at least one block indentation therein, and wherein each clamping structure includes at least one clamping indentation therein, with the at least one post being positioned between the brush holder support block and the clamping structure in a space formed by the block and clamping indentations.

9. The test system of claim 8 wherein the at least one post 45 includes two posts, wherein the at least one block indentation includes two block indentations, and wherein the at least one clamping indentation includes two clamping indentations, with the two posts being positioned between the brush holder support block and the clamping structure in two spaces formed by the two block indentations and the two clamping indentations, and further including, for each brush holder support block and each clamping structure, a respective bolt extending at least partially through the brush holder support block and the clamping structure.

10. The test system of claim 9 wherein at least one of the two posts of each brush holder comprises a magnet.

* * * * *